United States Patent [19]

Khalid

[11] Patent Number: 5,165,844

[45] Date of Patent: Nov. 24, 1992

[54] ON-LINE STALL MARGIN ADJUSTMENT IN A GAS TURBINE ENGINE

[75] Inventor: Syed J. Khalid, Palm Beach Gardens, Fla.

[73] Assignee: United Technologies Corporation, Hartford, Conn.

[21] Appl. No.: 789,556

[22] Filed: Nov. 8, 1991

[51] Int. Cl.$^5$ .............. F01B 25/00; F01D 17/00; F03B 15/04
[52] U.S. Cl. .............................. 415/17; 415/26; 415/30; 415/33; 415/47; 415/48; 415/49; 364/431.01; 364/431.02
[58] Field of Search .............. 415/89, 26, 30, 33, 415/36, 47, 48, 49; 364/431.01, 431.02

[56] References Cited

U.S. PATENT DOCUMENTS

| | | | |
|---|---|---|---|
| 3,614,253 | 10/1971 | Gaertner | 415/147 |
| 4,338,061 | 7/1982 | Beitler et al. | 415/175 |
| 4,849,895 | 7/1989 | Kervistin | 364/431.02 |
| 4,958,289 | 9/1990 | Sum et al. | 416/27 |

Primary Examiner—Edward K. Look
Assistant Examiner—Mark Sgantzos

[57] ABSTRACT

The deflection angle of a gas turbine stator is adjusted in proportion to the difference between two parameters computed from $N_2$ and TT2 using the same function generator. One parameter is a reference adjustment under standard conditions for measured $N_2$ adjusted to sea level and standard temperature. The second parameter is an adjustment for actual altitude conditions. The parameters manifest the clearance between the engine case and the turbine blade tips.

8 Claims, 4 Drawing Sheets

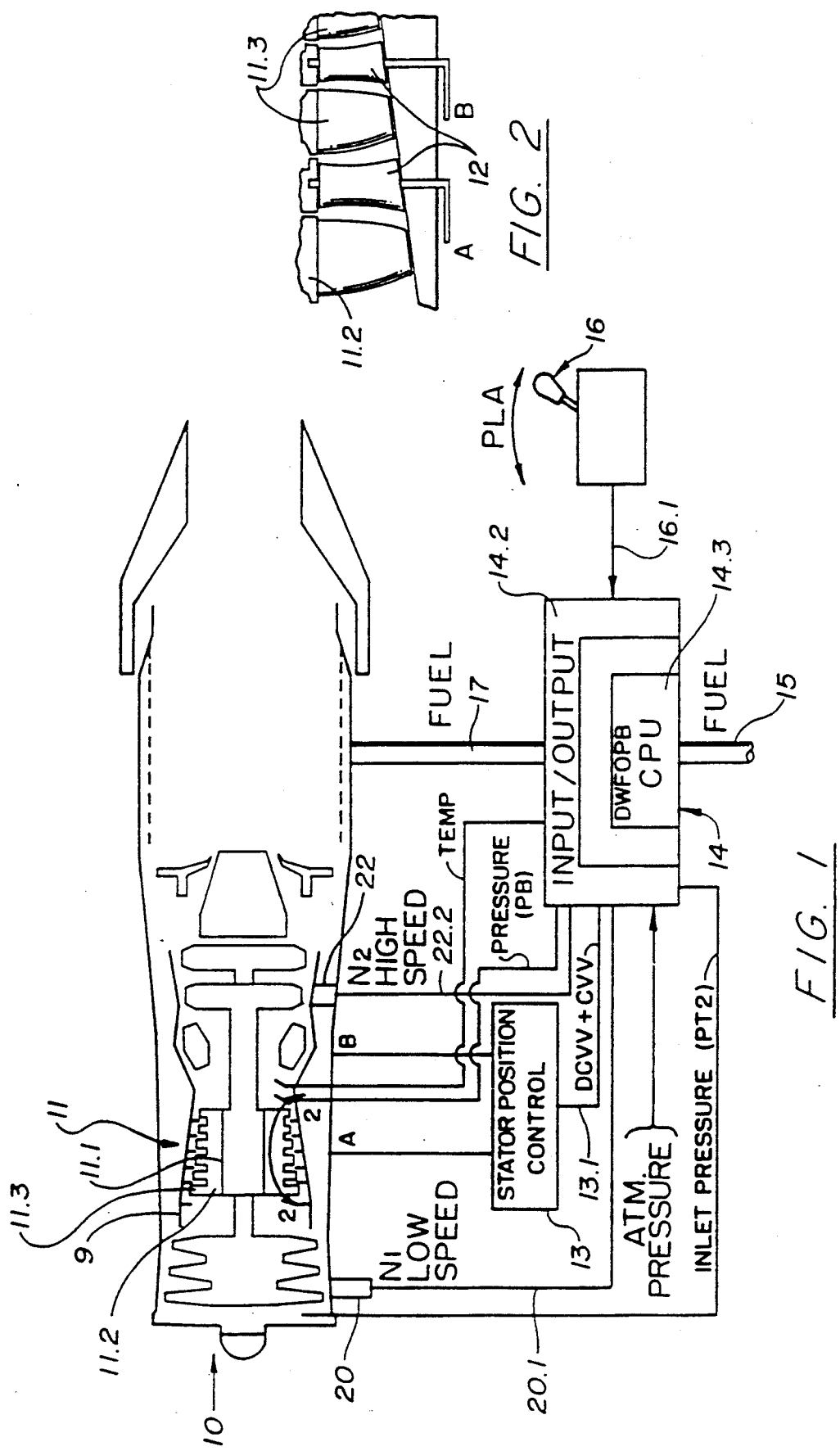

ON-LINE STALL MARGIN ADJUSTMENT IN A GAS TURBINE ENGINE

CROSS REFERENCE TO OTHER APPLICATIONS

This application describes apparatus also described in the application titled CONTROLLING STALL MARGIN IN A GAS TURBINE ENGINE DURING ACCELERATION by Syed J. Khalid, Ser. No. 07/789,557, now U.S. Pat. No. 5,165,845, also assigned to United Technologies Corporation and filed simultaneously herewith.

1. Technical Field

This invention relates, in general, to gas turbine engines and, in particular, to controlling stall margin in gas turbine engines.

2. Background Art

Stators are used to control the efficiency of a gas turbine compressor and provide an acceptable level of compressor stall margin at the same time. U.S. Pat. No. 4,995,786, granted Feb. 16, 1991, shows one example of a stator arrangement. It is conventional knowledge that many factors contribute to the stall characteristics of a gas turbine engine, among them, the thermal characteristics of the gas compressor which changes the clearances (CL) between the compressor case and blades. The clearance changes the aerodynamic characteristics of the compressor blades and thus the angle of attack tolerance of the blades by creating different levels of turbulence, which increases with clearance. The principal purpose of the stators is to modify the angle of attack between the compressor blades and the incident airflow, to provide an acceptable stall margin.

Other factors that contribute to the stall characteristics of the gas turbine engine include incoming air total pressure (PT2) variation, the compressor pressure (PB), and the level of fuel enrichment (DWFOPB) during acceleration.

DISCLOSURE OF INVENTION

According to the present invention, the stator deflection angle is increased or decreased as a function of differential signal generated by comparing two parameters reflecting blade-case clearance. One parameter is a programmed or predicted clearance based on $N_2$ and TT2, the second parameter is a reference clearance based on $N_2$ and TT2 adjusted for a sea level reference condition. Both parameters are produced from the same transfer function, empirically derived for the specific engine.

An object of the present invention is providing precise stall margin control based closely on blade-case clearances. Other objects may be evident from the drawings and following discussion of the invention.

BRIEF DESCRIPTION OF DRAWINGS

FIG. 1 is a functional block diagram showing a gas turbine engine and a computerized control system for controlling fuel flow to the engine and operation of a stator vane position control in response to various input signals provided to the fuel control.

FIG. 2 is a magnified view of a portion of the gas turbine compressor stage and fundamentally illustrates two stator vanes, such as those shown in U.S. Pat. No. 4,995,786, for controlling stall margin.

BEST MODE FOR CARRYING OUT THE INVENTION

Figure 3:
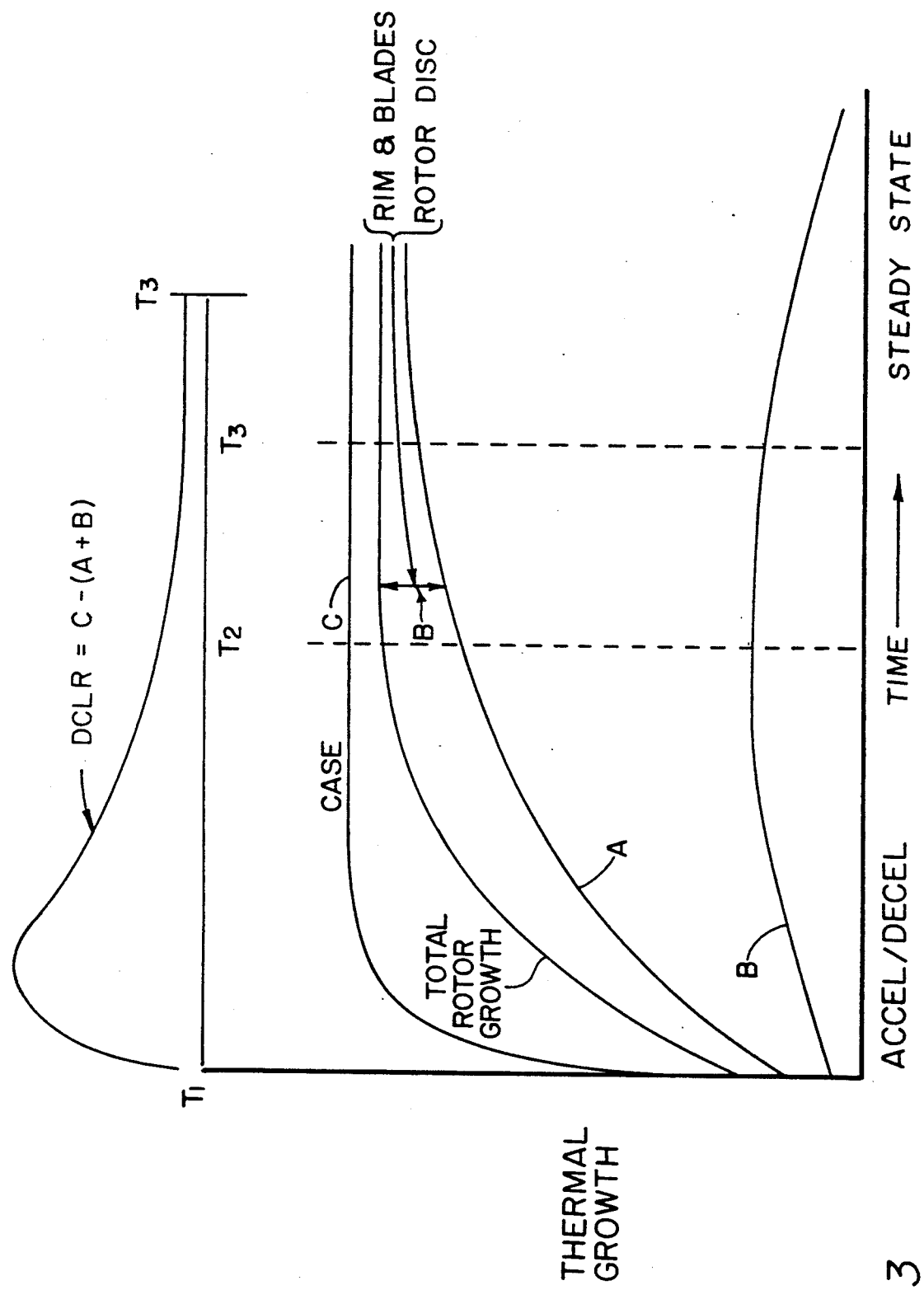
FIG. 3 is a time-based graph showing the thermal characteristics of the rotor disk, the rim and blades and the case as synthesized signals produced according to the present invention and includes an additional signal showing the change in clearance between the disk and the blades as a function of time. These signals are on a common time line.

In FIG. 1, a gas turbine 10 contains a compressor section 11 which includes a plurality of compressor stages 11.1, each stage comprising a disk (11.1), a rim on the disk (11.2), and compressor blades (11.3) on that rim. A case 9 contains the compressor.

The stator is not seen in FIG. 1, but appears in the enlargement in FIG. 2 under numeral 12. The stator has movable vanes 12, which can be individually moved by respective controls A and B to control air flow to compressor blades 11.3 on the rim 11.2. U.S. Pat. No. 4,995,786 shows similar vanes under the reference numeral 24. There, the movement of the blades 24 is provided by a control arm 48, which corresponds to the control arms A and B shown in FIG. 2. For the purposes of this discussion, it is sufficient to understand that the position of the vanes is varied by a stator position control 13 in FIG. 1 in response to the sum of two signals DCVV and CVV, the magnitude of which determines vane deflection.

In FIG. 1, a digital fuel control 14 controls fuel flow through a line 15 to the engine on a line 17. The fuel control contains a central processing unit, or computer 14.3, which is connected to its "environment" by an input/output section 14.2. The input/output section is connected by a line 16.1 to a power lever 16 to receive a signal indicating the magnitude of power lever advance PLA. A signal indicating the atmospheric pressure is also provided to the input/output section 14.2, indicating $N_2$ from a sensor 22. Inlet pressure PT2 is provided over a line to the input/output section. A signal PB, indicating the compressor pressure, is provided over a line. A signal TEMP, indicating the compressor temperature, is also provided to the input/output section. The control 14 also receives a signal indicating the speed of the gas turbine's low speed fan section $N_1$ over a line 20.1 from a sensor 20.

In the following discussion it will be explained that the control 14 controls the positioning of the vanes 12 by varying the magnitude of a signal DCVV+CVV, by synthesizing the temporary growth in the space between the blade tips and the case when engine acceleration beings to vary DCVV. The processor performs these routines by sensing PT2 and PB.

Figure 5:
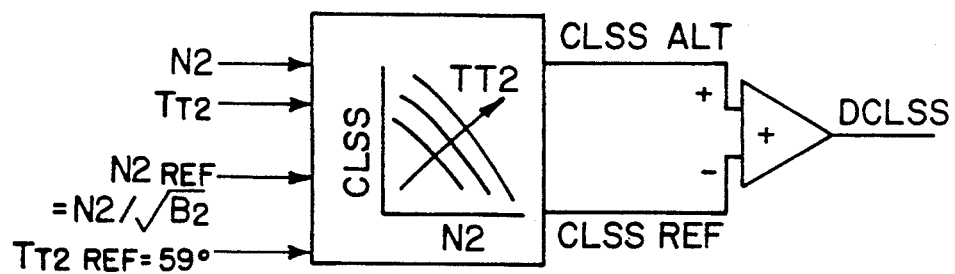
FIGS. 5-8 are block diagrams of four transfer functions employed in generating signals.
Figure 6:
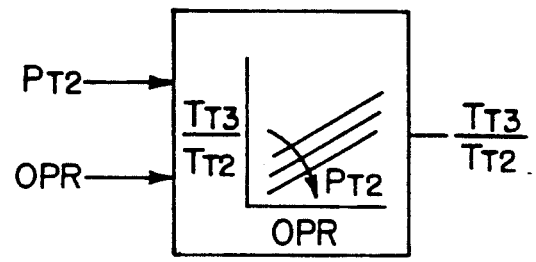
Figure 7:
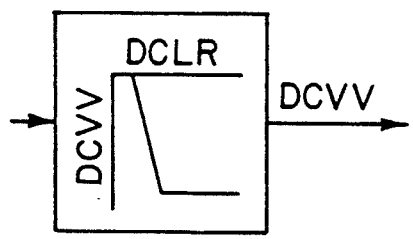
Figure 8:
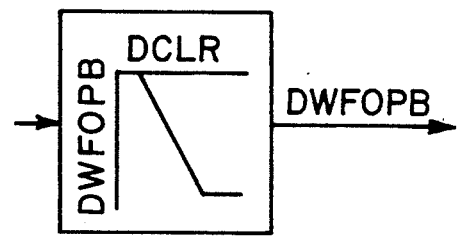

In FIG. 3, a signal DCLTR represents the change in clearance between the tips and the cases, and increases from some nominal value at $T_1$ to a peak at $T_2$ and then ultimately decays back to nearly the nominal value at $T_3$. The signal is synthesized in the present invention by synthesizing three distinct signals, one for the change in radial thermal size of the rotor disk, one for the rim and blades, and one for the case as shown in FIG. 5. Each of these components has its own unique thermal dynamic growth characteristics represented by its own thermal time constant ($\tau_C$, $\tau_D$, $\tau_R$) which is made more accurate at any operating condition by multiplying by R which is a function of compressor pressure (Equation 1). In FIG. 3, the thermal expansion of each of these is shown by signals A, B, and C. The signals A and B are subtracted from the signal C, the difference being DCLTR. Signal DCLTR is applied by the computer to the transfer function in FIG. 7 to produce a signal DCVV, which is summed with the normal or steady state signal CVV for controlling the steady state position of the stator control 13. The magnitude of DCVV augments the signal CVV to increase the angle of the vanes 12 as a function of the magnitude of DCLTR. At $T_1$ and at $T_3$, DCLTR is 0 and the position of the stator blades is determined solely by the magnitude of the signal CVV on line 13.1. On acceleration DCLTR follows the shape in FIG. 3.

Figure 4:
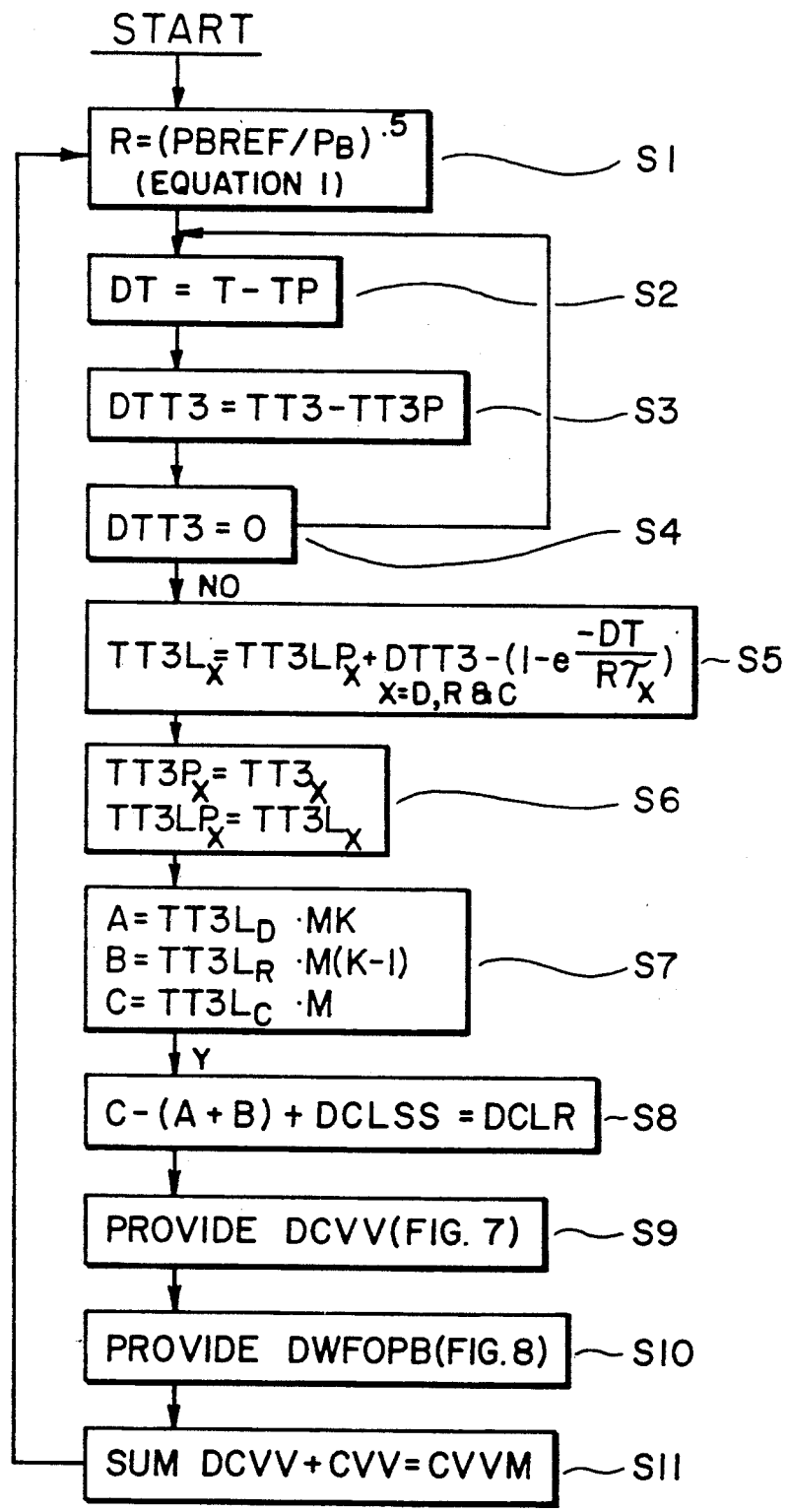
FIG. 4 is a flow chart of signal processing steps for producing a stator control signal and an acceleration fuel derichment signal according to the present invention.

With the aid of the flow chart shown in FIG. 4, equations 1–4 set forth below and the transfer functions shown in FIGS. 5–8, the signal processing routine by which the signal DCVV is generated and then summed with the signal CVV will now be discussed. Beginning in step 1, the scaling factor R is computed using Equation 1, to compensate the time constants as a function of the compressor pressure, which directly effects the thermal expansion rate of the disk rotor and case. It should be noted that the production of the three signals A, B, C associated with the disk rotor and case is effected incrementally by the signal processor in discrete steps having a duration "DT". As described at step S2, DT is equal to the change in time T from a previous time TP. This "sampling interval" is arbitrarily based upon the computing time and may be something like 50 ms. It is particularly important to realize that from this sampling interval DT, a signal is synthesized from PT2 and OPR using the transfer function in FIG. 6, in incremental steps, manifesting an increase in engine power. In particular, in step S3, a change in TT3 (DTT3) is measured (assume TT2 is a constant) and, in step S4, a tests is made to determine whether or not there has been a change within the sampling time DT there has been a change in engine power. If there has been no change, an affirmative answer in step S4, the process returns to step S2, once again to see if there has been a sufficient change in DTT3 within the sampling time DT. If, however, a change is detected in step S4 (a negative answer), the sequence proceeds to step S5. In step S5, a signal TT3L is separately computed for the disc rotor and the case. In FIG. 4, this signal is identified as $TT3_x$ where x identifies the disc (D), case (C) and rotor (R). $TT3L_x$, and exponential curve over time, is computed by adding the previously stored level of $TT3L_x$ and summing this with the product of the change in TT3 (DTT3 in step S3) and an exponential value for the increment of time DT based upon the time constant $Rr_x$. In step S6, the previously computed value for $TT3P_x$ is entered as the updated value for TT3 and the value of $TT3LP_x$ is entered as the updated value of TT3L. This carries out the iterative process over one increment of time DT by which one increment of signal $TT3L_x$ is synthesized. In step S7, the value for each of the signals A, B, and C is produced based upon the instantaneous values at that time for the product of the instantaneous $TT3L_x$ and a first order transfer function scaler to produce a signal manifesting "radial growth". Equations 2, 3 and 4 below, which are first order transfer functions for the radial growth of the disc rotor/bleed and case contain each scaler, i.e., as K for the disc, M(K-1) for the rotor and blades and M for the case. (The subscript D, R and C in these equations identifies parameters for the disk, rotor and case, respectively.) In step S8, DCLSS is produced according to the transfer function shown in FIG. 5. DCLSS is a signal representing a programmed adjustment for the vane deflection based upon the difference between a computed clearance (CLSSREF) at standard operating conditions and a computer clearance (CLSSALT) computed applying the same transfer function on $N_2$ and TT2 under two conditions, at altitude, yielding CLSSALT, and at a reference condition, yielding CLSSREF. At this "reference" condition, TT2 is 59° F. and $N_2$REF is computed using equation 5, below, where $\theta=(TT2°$ F.$+459.7°$ R)/518.7° R. CLSSALT and CLSSREF are not computed simultaneously in this embodiment, but successively on each computation cycle through the routine in FIG. 3 DCLSS, it can be seen, is computed by taking the difference between the most current CLSSALT and CLSSREF values in a computation cycle. In step S9, a signal DCLR, which is produced in step S8, is processed to produce the vane deflection signal DCVV using the transfer function shown in FIG. 7. Similarly, in step S10, the value of DCLR, computed in step S8, is used to provide a fuel enrichment signal (DWFOPB) following the general transfer function shown in FIG. 8. Finally, in step S11, DCVV is summed with the actual (normal) vane deflection signal (CVV) to control the orientation of the stator vanes. As a result of these steps, it should be noted that the stall margin of the compressor is temporarily lowered when the signal DCLR reaches its maximum in FIG. 3 and then is restored to a static level at and after time T3 as a direct function of CVV. However, the magnitude of the stall margin at that time will be augmented, nonetheless, by the magnitude of the signal DCLSS.

$$B = (PBREF/P_B)^{.5} \quad \text{Equation 1}$$

$$\frac{M \cdot K}{1 + B\tau_2 S} \quad \text{Equation 2}$$

$$\frac{M(K-1)}{1 + B\tau_2 S} \quad \text{Equation 3}$$

$$\frac{M}{1 + B\tau_3 S} \quad \text{Equation 4}$$

$$\frac{N_2}{\sqrt{\theta_2}} \quad \text{Equation 5}$$

While the foregoing is a description of the best mode for carrying out the invention, it can be easily appreciated that certain aspects of the invention may be changed, in whole or in part, without departing from the true scope and spirit of the invention. For example, it is possible to actually sense acceleration speed by sensing the change in $N_2$ rather than synthesizing the onset of an acceleration using P2 and a calculated OPR.instead of synthesizing a representative gas temperature TT3 from calculated OPR and P2, it is possible to synthesize another representative gas temperature based on some other calculated engine parameter such as corrected rotor speed, which is indicative of power level change. Similarly, depending upon the particular engine, the scaling factor R, which increases the time delay of the signals A, B and C based upon actual burner pressure to accommodate the greater heat transfer, may take into account other factors associated with the heat transfer characteristics within the compressor stage. Of course, the signals A, B, C can be produced with analog processing, for instance, by applying a step signal in response to TT3 to three filters with the time constants $R\tau_D$, $R\tau_R$, $R\tau_C$. Other modifications and variations may be apparent to one skilled in the art with the benefit of the foregoing explanation of the invention.

I claim:

1. A control for a gas turbine engine having a compressor comprising a case, disk and rim with turbine blades at a clearance from the case and stator vanes and a stator vane control to adjust stall margin in the compressor, characterized by:

means for providing a first signal with a level that establishes a first stator vane deflection to achieve a first stall margin level;

means for providing a second signal that represents the difference between a first clearance using a first transfer function between the blade tips and the case based on actual engine operating conditions and a second clearance computed using the same transfer function and said engine operating conditions scaled to a standard ambient condition;

means for providing a third signal from said second signal to change the deflection of the vanes in relation to the magnitude of said third signal according to a transfer function; and means for summing said first and third signals to control the position of said stator vanes.

2. A control according to claim 1, further characterized in that said operating conditions are engine compressor speed $N_2$ and inlet temperature TT2.

3. A control according to claim 2, further characterized in that said second clearance is computed by dividing $N_2$ by the square root of TT2 divided by a reference temperature.

4. A control according to claim 3, further characterized in that said reference temperature is 518.7° R.

5. A method for controlling stall margin in a gas turbine engine having a compressor comprising a case, disk and rim with turbine blades at a clearance from the case and stator vanes and a stator vane control to adjust stall margin in the compressor, characterized by the steps:

providing a first signal with a level that establishes a first stator vane deflection to achieve a first stall margin level;

providing a second signal that represents the difference between a first clearance using a first transfer function between the blade tips and the case based on actual engine operating conditions and a second clearance computed using the same transfer function and said engine operating conditions scaled to a standard ambient condition;

providing a third signal from said second signal to change the deflection of the vanes in relation to the magnitude of said third signal according to a transfer function; and summing said first and third signals to control the position of said stator vanes.

6. A method according to claim 5, further characterized in that said operating conditions are engine compressor speed $N_2$ and inlet temperature TT2.

7. A method according to claim 6, further characterized in that said second clearance is computed by dividing $N_2$ by the square root of TT2 divided by a reference temperature.

8. A method according to claim 7, further characterized in that said reference temperature is 518.7° R.

* * * * *

UNITED STATES PATENT AND TRADEMARK OFFICE
CERTIFICATE OF CORRECTION

PATENT NO. : 5,165,844
DATED : November 24, 1992
INVENTOR(S) : Syed J. Khalid

It is certified that error appears in the above-identified patent and that said Letters Patent is hereby corrected as shown below:

Col. 2, line 57, "beings" should read --begins--.

Col. 2, line 60, "cases" should read --case--.

Col. 3, line 54, "$Rr_x$" should read --$RT_x$--.

Signed and Sealed this

Twelfth Day of April, 1994

Attest:

BRUCE LEHMAN

Attesting Officer

Commissioner of Patents and Trademarks